United States Patent [19]

White et al.

[11] Patent Number: 5,393,277

[45] Date of Patent: Feb. 28, 1995

[54] VARIABLE ELECTRONICALLY CONTROLLED SHIFT POINTS FOR A CRUISE CONTROL SYSTEM

[75] Inventors: Gregory R. White, Columbus, Ind.; Larry R. Webber, Fredericksburg, Tex.; Dean S. Anderson, Cedar Falls, Iowa; Lloyd E. Flory, Edinburgh, Ind.; Jon A. Steeby, Schoolcraft, Mich.

[73] Assignee: Cummins Electronics Company, Inc., Columbus, Ind.

[21] Appl. No.: 134,929

[22] Filed: Oct. 12, 1993

[51] Int. Cl.$^6$ .................................................. F16H 61/02
[52] U.S. Cl. ................................................... 477/108
[58] Field of Search ....................................... 477/108

[56] References Cited

U.S. PATENT DOCUMENTS

| | | | |
|---|---|---|---|
| 4,933,859 | 6/1990 | Tsuyama et al. | 364/426.04 |
| 4,982,805 | 1/1991 | Naitou et al. | 180/179 |
| 5,001,944 | 3/1991 | Ogawa et al. | 477/108 |
| 5,251,138 | 10/1993 | Katayama | 364/426.04 |

Primary Examiner—Dirk Wright
Attorney, Agent, or Firm—James M. Durlacher

[57] ABSTRACT

An engine-transmission control system is disclosed which provides for variable shift points of a manual-/automatic transmission during cruise control and non-cruise control operation of the vehicle. Vehicle speed, engine speed, and engine loading are variables used individually or in combination in order to determine when shifting of the automatically controllable gear ratio operation states of the manual/automatic transmission will occur. In addition, the system includes modes of operation which include algorithms for determining varying gear shift points so that gear shifting of the top two gears occurs at various vehicle speeds dependent upon input parameters to the cruise control system and additionally in response to which cruise control mode of operation is currently selected by the driver. In addition, control of the automatic shifting of the manual-/automatic transmission when the cruise control system is inactive or disabled is determined according to algorithms designed to optimize fuel economy as well as improve driveability of the vehicle and reduce driver fatigue.

29 Claims, 7 Drawing Sheets

VARIABLE ELECTRONICALLY CONTROLLED SHIFT POINTS FOR A CRUISE CONTROL SYSTEM

BACKGROUND OF THE INVENTION

1. Field of the Invention

This invention relates generally to electronically controlled transmission/engine drive train systems and more specifically to those having a manual/automatic transmission wherein the transmission includes manually selectable gear ratio operating states and automatically or electronically selectable gear ratio operating states operable in conjunction with electronic cruise control systems.

The present invention relates to control systems and methods of operation for manual/automatic heavy duty engine/transmission systems wherein gear selection and gear shifting timing decisions are made and/or executed based upon measured and calculated parameters such as gear engagement condition of the transmission, vehicle or transmission output shaft speed, transmission input shaft speed, engine speed, throttle position, and the like. Until recently, transmissions, particularly for heavy duty applications, have historically been the manual shift type requiring actuation of a clutch and gear shift lever by the driver in order to change final drive gear ratios. Final drive gear ratio selection transmission via a shift linkage, for mechanically disengaging and engaging various available final drive gear ratios of the transmission. Due to the large number of gear ratios associated with compound transmissions or transmissions having a splitter type auxiliary section, a heavy burden is borne by the driver to manually shift throughout the entire set of available final drive gear ratios or operation states of the transmission. Even after the vehicle has reached highway cruising speeds, road grade variations demand that the driver shift between the highest two gear ratios to maintain vehicle speed relatively constant. More recently, successful devices that combine manual and automatic shifting operation under certain conditions have been developed such as the invention disclosed in U.S. Pat. No. 4,722,248, the disclosure of which is incorporated by reference.

When an electronic shift control system is coupled to a manual/automatic transmission, a lessening of operator fatigue and improved fuel economy result. A device which combines manual shifting of lower vehicle speed final drive gear ratios with automatic shifting between sequentially related higher vehicle speed final drive gear ratios, and more particularly between the "top two" available gear ratios of the manual/automatic transmission will serve to reduce driver fatigue. By providing for automatic gear selection of the two highest gear ratio operation states of the transmission, or the "top two" gears, an automatic shift schedule can be developed for increasing fuel economy. Additionally, an automatic gear shift device can be used in conjunction with cruise control electronics systems compatible with heavy duty truck applications.

Considerations related to the operation of a cruise control system for a heavy duty truck hauling a very heavy payload give rise to issues relating to when a gear shift should occur between the top two gears of the manual/automatic transmission. If the shift point is strictly mile per hour based, maximum fuel efficiency is compromised due to excessively high or low engine RPM. In fact, the system may never shift gears at all if the cruise speed is set below the mile per hour shift point for the manual/automatic transmission cruise control system. On the other hand, if the shift point is strictly a function of RPM, fuel efficiency may improve, but driveability of the vehicle is compromised due to the fact that the acceleration capability of the vehicle is fixed through vehicle control electronics. Here again, the vehicle may never shift if cruise speed, i.e. the engine RPM, is set below the RPM shift point. In addition, the load borne by the engine of the vehicle in response to climbing an incline at full payload provides a factor or element in the decision-making process for determining what gear ratio is appropriate under these conditions. Shift timing is lost and driveability is compromised if the loading of the vehicle engine versus peak torque and power output levels are not considered in determining at what speed automatic gear shifts should occur.

Thus, a control system for controlling the shift points in a variable fashion for a cruise control system coupled to a heavy duty truck transmission having at least two automatically selectable gear ratio operation states is needed for maximizing efficiency and improving driveability of the vehicle.

SUMMARY OF THE INVENTION

A cruise control system for automatically controlling speed and transmission shifting of an engine powered vehicle in response to receiving a desired speed input from the driver, according to one aspect of the present invention, comprises an engine, a manual/automatic transmission including a plurality of manually engagable gear ratio operation states and a first and a second automatically engagable gear ratio operation states, the first and second gear ratio operation states actuated in response to downshift and upshift signals, respectively, supplied to an input of the transmission, means for sensing vehicle speed and producing a speed signal corresponding thereto, means for sensing engine speed and producing an RPM signal corresponding thereto, means for inputting a desired vehicle speed value from the driver, means for fueling the engine, the means for fueling responding to the speed signal and adjusting the fueling supply rate for the engine to maintain the speed signal within a predetermined deviation from the desired speed value, means for producing the downshift signal according to the following downshift equation:

If [(RPM<cruise_dwn_rpm * HS_IDLE_RPM) .AND.
(cruise_set_speed - VSS>cruise_DWN) .OR.
(RPM<cru_dwn_rpm2 * HS_IDLE_RPM)]
then produce the downshift signal; and means for producing the upshift signal according to the following upshift equation:

If [(RPM>cruise_up_rpm * HS_IDLE_RPM) .AND.
(cruise_set_speed-VSS<cruise_UP) .OR.
(RPM>cru_up_rpm2 * HS_IDLE_RPM)]
then produce the upshift signal, wherein the variables of the upshift and downshift equations are defined as follows:
RPM=engine speed,
VSS=vehicle speed,
HS_IDLE_RPM is a rated engine speed value defining a maximum operational engine speed based upon engine design, cruise_set_speed is a cruise control set speed established by the driver during cruise control operation, cruise_dwn_rpm is a scaling factor multiplied times HS_IDLE_RPM to produce a first engine speed value below rated engine speed of the engine, CRU_DWN_RPM2 is a scaling factor multiplied times HS_IDLE_RPM to produce a second engine speed value that is greater than CRUISE_DWN_RPM*HS_IDLE_RPM, CRUISE_UP_RPM is a scaling factor multiplied times HS_IDLE_RPM to produce a third engine speed value, CRU_UP_RPM2 is a scaling factor multiplied times HS_IDLE_RPM to produce a fourth engine speed value that is greater than CRUISE_UP_RPM*HS_IDLE_RPM, CRUISE_DWN is a first vehicle speed offset value, and CRUISE_UP is a second vehicle speed offset value.

A control system, according to another aspect of the present invention, for automatically controlling transmission shifting of an engine powered vehicle comprises an engine, a manual/automatic transmission including a plurality of manually engagable gear ratio operation states and a first and a second automatically engagable gear ratio operation states, the first and second gear ratio operation states actuated in response to downshift and upshift signals, respectively, supplied to an input of the transmission, means for sensing vehicle speed and producing a speed signal corresponding thereto, means for sensing engine speed and producing an RPM signal corresponding thereto, throttle means responsive to driver commands for producing a throttle signal corresponding to the engine throttle level desired by the driver, means for fueling the engine, the means for fueling responding to the throttle signal and adjusting the fueling supply rate for the engine in accordance therewith, means for producing the downshift signal according to the following downshift equation:

If
[(RPM <= NORMAL_DWN*HS_IDLE_RPM) .AND. (THROTTLE <> CLOSED)]
.OR.
[(RPM <= COAST_DWN*HS_IDLE_RPM) .AND (THROTTLE=closed)]

then produce the downshift signal, and means for producing the upshift signal according to the following upshift equation:

If
[(RPM > NORMAL_UP * HS_IDLE_RPM) .AND. (THROTTLE <> CLOSED)]
.OR.
[(RPM>COAST_UP * HS_IDLE_RPM) .AND. (THROTTLE=CLOSED)]

then produce the upshift signal, wherein the variables of the upshift and downshift equations are defined as follows:

RPM = engine speed,

HS_IDLE_RPM is a rated engine speed value defining a maximum operational engine speed based upon engine design, NORMAL_DWN is a scaling factor multiplied times HS_IDLE_RPM to obtain a downshift engine speed at which a downshift from the second gear ratio operation state to the first gear ratio operation state is desired if THROTTLE is not closed, NORMAL_UP is a scaling factor multiplied times HS_IDLE_RPM to obtain an upshift engine speed at which an upshift from the first gear ratio operation state to the second gear ratio operation state is desired if THROTTLE is not CLOSED, COAST_DWN is a scaling factor multiplied times HS_IDLE_RPM to produce a first engine speed value at which a downshift is desired when the throttle is closed, COAST_UP is a scaling factor multiplied time HS_IDLE_RPM to produce a second engine speed at which an upshift is desired when the throttle is CLOSED, THROTTLE corresponds to the throttle signal, and CLOSED is a position of the throttle means corresponding to a throttle signal below a predetermined level thereby indicating that the driver is not requesting fuel flow to the engine above a predetermined idle speed throttle setting.

DESCRIPTION OF THE PREFERRED EMBODIMENT

Figure 1:
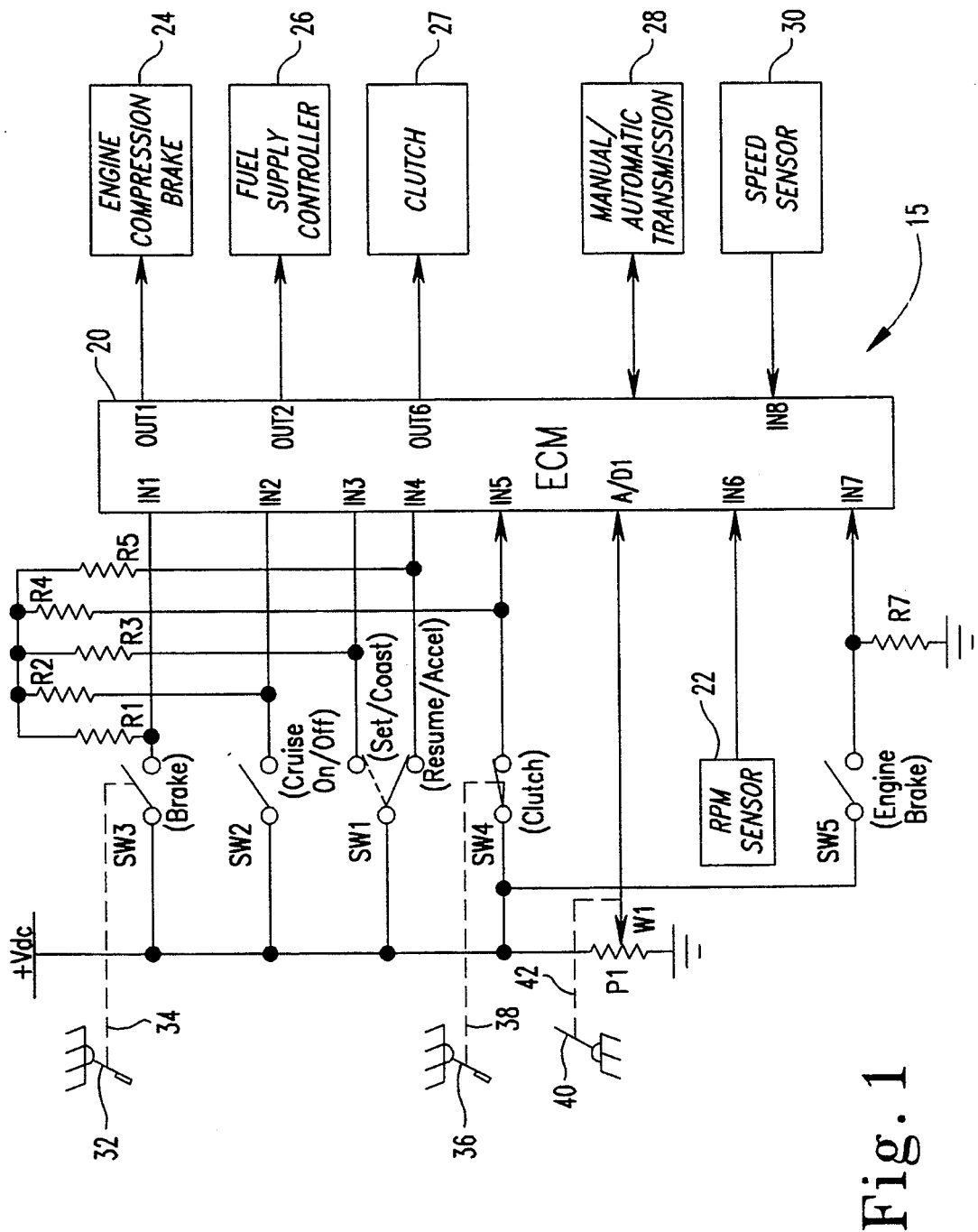
FIG. 1 is a diagrammatic illustration of an electronic controller consistent with the teachings of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a diagrammatic illustration of a control system 15 according to the present invention is shown. The control system 15 includes as its central component electronic control module (ECM) 20. ECM 20 is a microcomputer including a microprocessor having ROM and RAM and a plurality of inputs and outputs (I/O) in addition to interface circuits for I/O interfacing. The input signals supplied to ECM 20 are produced by various switches and sensors which respond to operating conditions and inputs from the driver.

Switch SW3, a normally open switch, provides an input to ECM 20 indicating when brake pedal 32 has been depressed or actuated. Brake pedal 32 is mechanically linked to switch SW3 via linkage 34. The signal from switch SW3 supplied to ECM 20 is normally a logic low as a result of resistor R1 pulling input IN1 of ECM 20 to ground or logic low when switch SW3 is in the open state. Switches SW1 and SW2 are mounted in the driver's cab or driver compartment and provide the driver with a means for turning the cruise control functions on and off, via switch SW2, and for establishing a desired cruise speed via switch SW1, as well as permitting the vehicle to coast without cruise control operation. Switch SW1 also provides input signals to activate resume/acceleration features well known in the art of cruise control systems. Switch SW2 enables cruise control operation while switch SW1 is used to activate the operational modes of the cruise control system built into the software of ECM 20. Switch SW1 is a momentary center-off SPDT switch. The set/coast cruise control function is activated by shorting input IN3 of ECM 20 to logic high voltage, or $+V_{DC}$. This is accomplished by closing switch SW1 and connecting $+V_{DC}$ to the signal path connected to resistor R3 and input IN3. In the alternative, when switch SW1 is actuated to connect input IN4 and resistor R5 with $+V_{DC}$, input IN4 is raised to a logic high and the ECM 20 is informed that the driver is actuating the resume or acceleration features of the cruise control system.

Switch SW4 provides an input signal to IN5 of ECM 20 indicative of the operational state of the vehicle clutch. The vehicle clutch is activated by clutch pedal 36. A mechanical linkage 38 interconnects switch SW4 with pedal 36 so that switch SW4 is opened when the driver or operator depresses clutch pedal 36 thereby mechanically disengaging the engine of the vehicle from the transmission of the vehicle. Switch SW4 is normally closed, thus when the clutch pedal 36 is released, a $+V_{DC}$ signal is supplied to input IN5 of ECM 20. When switch SW4 is opened, as a result of clutch pedal 36 being depressed, switch SW4 opens and resistor R4 pulls the input IN5 to logic low or ground.

Switch SW5 is a driver-operated switch which provides an input signal to the ECM 20 regarding the operating state (on/off) of the engine compression brake desired by the driver. Switch SW5 is a normally open switch which, when closed, supplies a high logic signal level to input IN7 of ECM 20 indicating engine brake operation is desired. When switch SW5 is open, resistor R7 pulls input IN7 to logic low or ground, thereby providing ECM 20 with a logic low signal corresponding to a driver request to disable or discontinue engine brake operation.

Accelerator pedal 40 is mechanically coupled, via linkage 42 to the wiper W1 of potentiometer P1. The wiper W1 is connected to an analog to digital (A/D) converter input A/D1 of ECM 20. The position of accelerator pedal 40 corresponds directly to the voltage present on wiper W1. Since potentiometer P1 is connected at one terminal to $+V_{DC}$ and at the other terminal to ground, the voltage present on wiper W1 ranges from ground to $+V_{DC}$. In this application, when accelerator pedal 40 is in the throttle closed or non-depressed position, the voltage present on wiper W1 is below a predetermined voltage corresponding to a throttle closed position. If the wiper W1 voltage is above a predetermined voltage, it is considered by the ECM 20 to be an indicator that the throttle is open.

Output OUT1 of ECM 20 supplies a signal to engine compression brake 24 which is a part of the engine of the vehicle (not shown), to provide engine compression braking operation as is well known in the operation of heavy duty trucks. Output OUT2 of ECM 20 provides continuously variable signals which control the fuel supply controller 26. The continuously variable signals supplied to fuel supply controller 26 enables ECM 20 to fuel the engine of the vehicle to any particular rpm (revolutions per minute) desired. Fuel supply controller may take the form of a fuel shut-off valve, fuel injectors or other fueling mechanisms responsive to electronic signals for controlling fuel supply rates to an engine.

Figure 2:
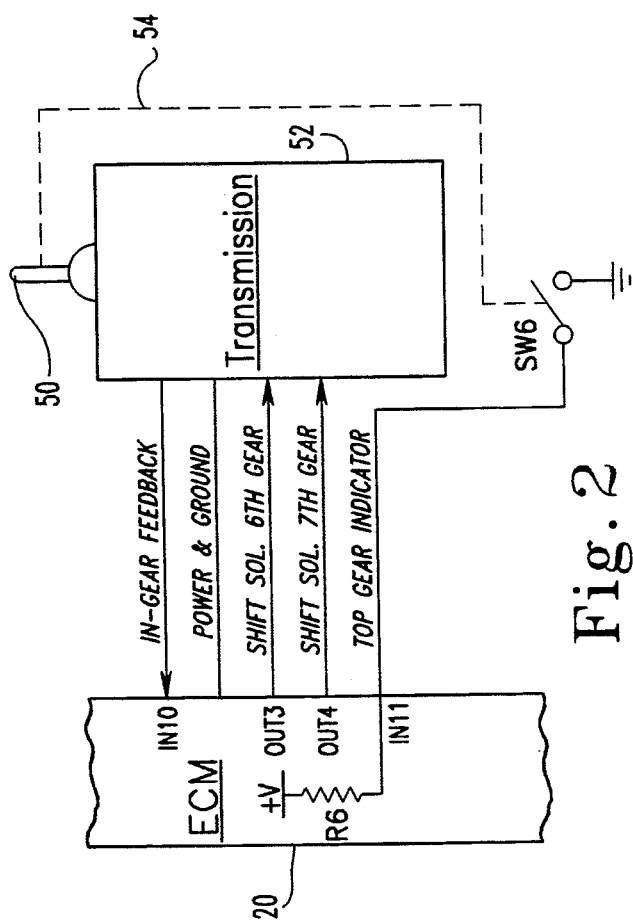
FIG. 2 is a diagrammatic illustration of one embodiment of the engine control module to manual/automatic transmission control interface.
Figure 3:
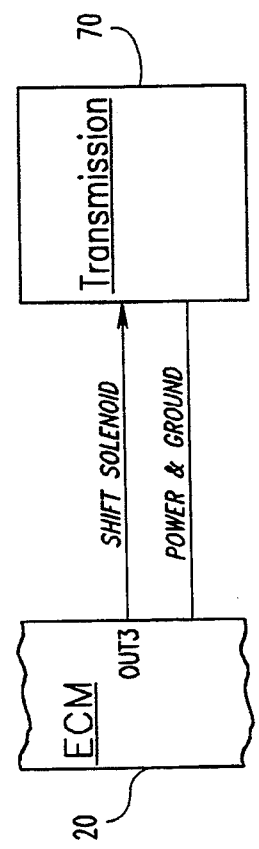
FIG. 3 is another embodiment of the control interface between engine control module and transmission of FIG. 1.

The manual automatic transmission 28 is connected via various signal path lines to ECM 20. Two different embodiments of particular transmission I/O interfaces are shown in FIGS. 2 and 3. Speed sensor 30 and RPM sensor 22 supply signals to ECM 20 indicative of the vehicle speed and engine speed, respectively. RPM sensor 22 supplies a pulse train signal to input IN6 of ECM 20. The pulse train signal supplied to input IN6 is monitored by ECM 20 to determine engine RPM speed. Similarly, the speed sensor 30, which detects tail shaft or drive shaft rotational speed, provides a similar pulse train signal to input IN8 of ECM 20 wherein the frequency of the pulse train delivered to ECM 20 indicates the speed of rotation of the output shaft of the transmission 28 or the drive shaft of the vehicle drive train.

The interface between ECM 20 and manual-/automatic transmission 28, or MAT 28, is more specifically shown for two different transmissions in FIGS. 2 and 3. The I/O interface between ECM 20 and manual-/automatic transmission 52 shown in FIG. 2 includes gear a position logic feedback signal supplied to input IN10 as well as an automatic shift-mode request switch SW6 that supplies a logic signal to input IN11 indicating whether automatic gear shifting operation is desired. Switch SW6 is actuated in response to driver positioning of gearshift lever 50. Gear shift lever 50 is coupled to switch SW6 via actuator linkage 54. Resistor R6 maintains the logic signal present at input IN11 of ECM 20 at a logic high whenever normally open switch SW6 is not closed. When switch SW6 is closed, the logic signal present at input IN11 is at a logic low level. Logic signals supplied to outputs OUT3 and OUT4 of ECM 20 control the actuation of sixth gear and seventh gear solenoid actuators (not shown) of the MAT 52. MAT 52 is a Spicer transmission Model No. AS125-7 manufactured by Spicer, a subsidiary of Dana Corporation. The signal supplied from MAT 52 to input IN10 of ECM 20 is a logic signal indicating that MAT 52 is in a neutral (no gears engaged) operational state when the signal is at a logic low level. When the signal supplied to input IN10 of ECM 20 from MAT 52 is a logic high signal, an "in-gear" state of operation of MAT 52 is indicated. The signal supplied to input IN10 does not indicate which automatically selectable gear ratio operation state is currently engaged. Nevertheless, ECM 20 is aware of the logic output levels at outputs OUT3 and OUT4. Thus, ECM 20 can determine whether MAT 52 has been placed into sixth gear automatic operation state or seventh gear automatic operation state by the status of outputs OUT3 and OUT4. Switch SW6 is actuated only when shift lever 50 is placed into the automatic operation mode position depicted by the shift position A in FIG. 4 wherein automatic actuation of sixth and seventh gear is requested by the driver of the vehicle. The other shift lever positions of FIG. 4 correspond to the reverse, first, second, third, fourth, and fifth gear ratio operation states which are manually selectable or engageable by the driver.

Figure 5:
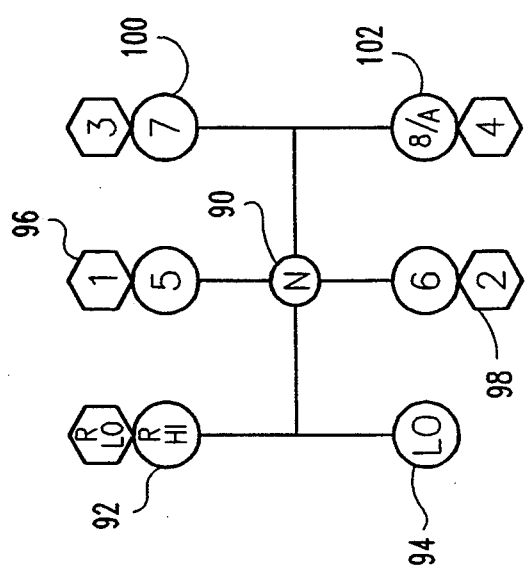
FIG. 5 is a diagrammatic illustration of an Eaton Fuller heavy duty truck transmission shift pattern.

In an alternative embodiment of the present invention shown in FIG. 3, ECM 20 is electronically connected to and interfaced with MAT 70, an Eaton/Fuller, Inc. transmission model RTT 12609A. The only I/O interface signal required between MAT 70 and ECM 20 is an output signal from output OUT3 supplied to the splitter gear box electro-pneumatic solenoid actuator (not shown) of MAT 70. The splitter gear box of MAT 70 provides an overdrive gear ratio when the MAT 70 is in the highest speed gear operation state. This is further illustrated in FIG. 5 by the gearshift pattern shown which corresponds to the Eaton/Fuller MAT 70. Neutral is found at position 90. Reverse gears are selectable at position 92 and forward gear ratio operational states that are manually selectable are shown at positions 94, 96, 98, 100, and 102. Once the driver has shifted manually through the gears according to the shift order of low, one, two, three, four, five, six, seven, and finally shifted the MAT 70 into the manual gearshift position labeled 8/A, the automatic shifting function of the ECM software is activated to shift back and forth between high split and low split to provide an overdrive final drive ratio or higher speed capability gear ratio for MAT. 70. Thus, at location 102 the position labeled 8/A is the last manually selected gear position during the manual gear shifting phase of vehicle operation prior to the engagement or selection of automatic shift-mode operation. Subsequently, gear shifting occurs in the "top two" gears according to shift algorithms contained within ECM 20.

The Eaton/Fuller embodiment of the present invention does not require switch SW6 since the auto-shift mode is detected, through software, by comparing engine speed and tailshaft speed. If the ratio of engine speed to tailshaft speed is within a predetermined ratio range, ECM 20 recognizes that the driver has shifted MAT 70 into position 102 in FIG. 5. Thereafter, until the ratio of engine speed to tailshaft speed falls outside the predetermined ratio range, ECM 20 controls the "top two" gears of MAT 20 according to shift algorithms forming a part of the ECM 20 software.

Although the interface between MAT 52 and ECM 20 versus the interface between MAT 70 and ECM 20 are substantially different, the operational features are significantly similar when either MAT 52 or 70 is placed into the automatic shift-mode operation state wherein the "top two" final drive gear ratio operation states are automatically selected by the ECM 20. Two electro-pneumatic solenoid valves (not shown) are actuated by logic signals supplied to output OUT3 and output OUT4 of ECM 20 in FIG. 2 to engage sixth gear, seventh gear or neutral operation mode of MAT 52. Pressurized air and air cylinder(s) (not shown) within the MAT 52 or 70 supply the automatic shift mode gear engaging action according to the position of the solenoid valve(s).

One electro-pneumatic solenoid valve is required to operate the splitter of MAT 70 shown in FIG. 3. Thus, the signal supplied to output OUT3 actuates an electro-pneumatic solenoid valve (not shown) which actuates the splitter of MAT 70. The embodiments shown in FIG. 2 and FIG. 3 both include power and ground signals supplied via signal path 58 between the ECM 20 and the MATs 52 and 70.

Figure 7:
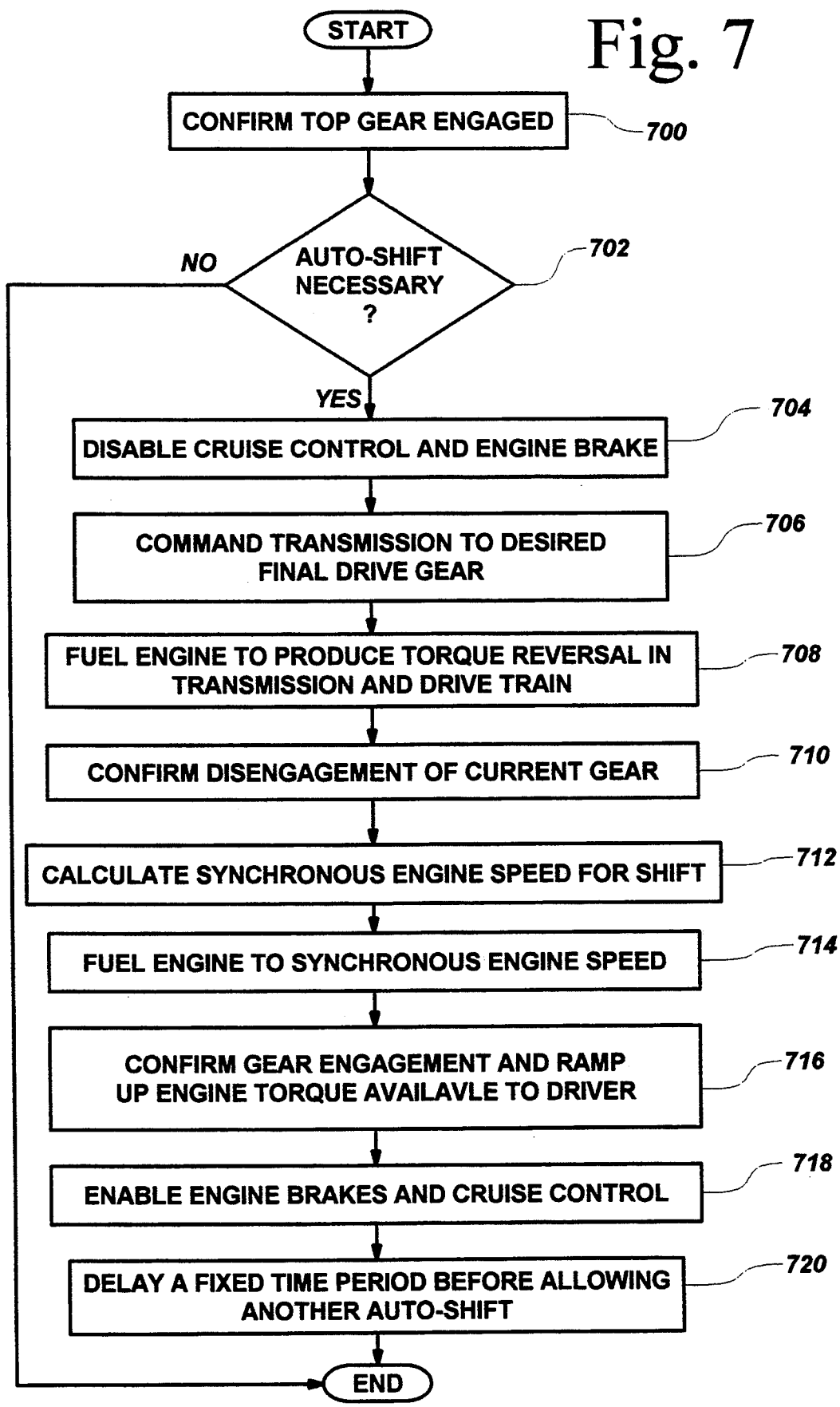
FIG. 7 is a flowchart of an auto-shift sequence according to the present invention.

Operationally speaking, the sequence of events which takes place when an auto-shift is to be performed in the top two gears of the system shown in FIG. 1 and FIG. 2 or FIG. 3 includes the following sequence of events (and is reflected in the flowchart of FIG. 7): (1) confirm that one of the top two gears is engaged, (step 700), (2) determine if an auto-shift is necessary, (step 702), (3) disable cruise control and engine brakes if active, (step 704), (4) command the transmission shift solenoid (or solenoids) to the requested gear, (step 706), (5) fuel the engine to produce a torque reversal in the transmission and drive train, (step 708), (6) confirm disengagement of the current gear, (step 710), (7) calculate synchronous engine speed to engage desired auto-shift gear ratio operation state, (step 712), (8) fuel engine to achieve synchronous engine speed, (step 714), (9) confirm gear engagement, (step 716), (10) ramp the engine torque available to the driver, (step 716), (11) return engine brakes and cruise control to their operational state prior to the auto-shift sequence initiation, (step 718), and (12) delay a fixed period of time before attempting another auto-shift (step 720).

A number of operational factors or conditions are monitored to determine whether to initiate or inhibit an auto-shift sequence. The ECM 20 continuously monitors the system inputs numerous times a second to determine whether or not an auto-shift sequence can be initiated. A preferred repetition time span is approximately 96 milliseconds, although other repetition time intervals are contemplated; that is the ECM 20 should determine whether an auto-shift condition is present and whether an auto-shift should be initiated every 96 milliseconds. An auto-shift is inhibited if any of the following conditions exist: (1) one of the top gears is not confirmed as engaged, which is a condition precedent for an automatic mode upshift or an automatic mode downshift, (2) vehicle speed is below a predetermined level, (3) the clutch pedal is depressed before or during the auto-shift process, (4) a shift delay has not elapsed since the previous auto-shift, and (5) other system faults which indicate to the ECM 20 that an automatic mode shift or auto-shift should not occur, such as speed sensor or RPM sensor failure, or other such hardware failures which prevent proper and safe operation of the auto-shift mode of operation.

In addition to determining when an auto-shift should occur, the control system of FIG. 1 also provides cruise control mode operation of the vehicle in conjunction with the auto-shift control of MAT 28. The control logic of ECM 20 will initiate automatic upshifts, shifting from a lower to a higher vehicle speed gear ratio operation state, in "non-cruise" mode when the engine speed approaches the rated engine speed for the engine. Automatic "non-cruise" downshifts will be initiated when the engine speed is below a percentage of the "non-cruise" upshift engine speed to introduce hysteresis and prevent gear-hunting or constant gear shifting when the engine is fueled to move the vehicle at a speed close to or at a speed corresponding to an auto-shift shift point speed. Control logic or software within ECM 20 executes an automatic downshift in "non-cruise" mode when the throttle pedal is in the idle position (throttle closed) and when the engine speed falls below a minimum predetermined speed, typically (0.68)*(High_Idle). High_Idle is defined as 1700-1800 RPM, which value is the maximum engine RPM before an electronic road speed governor (included in the software of ECM 20) decreases fueling to prevent further increases in engine RPM.

In addition, the control logic of ECM 20 determines the engine RPM speed at which automatic upshifts and downshifts will occur while in the "cruise" mode based upon an algorithm which provides variable shift points in response to operating conditions sensed by ECM 20. ECM 20 controls exclusively the engine brakes, clutch operation, and engine fueling during the auto-shift period.

Equipment failures which may result in undesirable operation of the vehicle must be anticipated and properly handled when they occur. An undesirable equipment failure state occurs when the switch SW6 of FIG. 2 fails "open" or fails "closed". For example, if the switch SW6 fails to open properly, the auto-shift mode is never enabled. This presents a problem since the transmission remains in neutral after the driver has requested auto-shift operation. If by chance the vehicle is traveling downhill at the time, the transmission is not placed into gear and the driver must use the service brakes to slow the vehicle. On the other hand, if switch SW6 fails in the "closed" state, the control system 15 is instructed or tricked into selecting one of the top two gears at all times. If the vehicle should slow down or come to a stop or encounter an incline, lower gear selection is impossible, therefore the vehicle may stall due to improper gear selection. Another undesirable condition can exist due to the driver intentionally allowing the vehicle to coast downhill in a neutral state to achieve higher speeds than the road speed governor would normally allow, (i.e. in excess of the rated speed of the engine). Thus, several algorithms must be included in the software of the ECM 20 in order to compensate for equipment failure modes and provide desirable operation of the control system 15 of FIG. 1.

Figure 4:
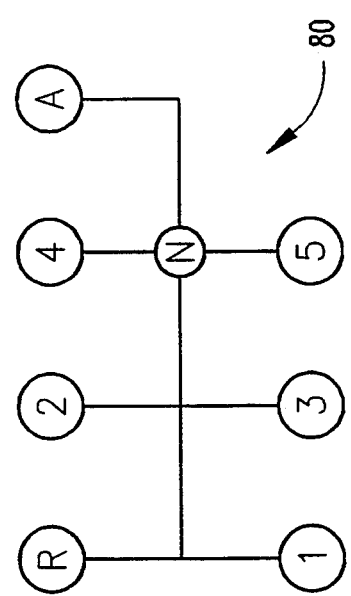
FIG. 4 is a diagrammatic illustration of the shift pattern for a Dana Spicer 7-speed heavy duty truck transmission.

During normal operation of the control system 15 in conjunction with the MAT 52 of FIG. 2, the driver at some time will request auto-shift mode by moving the shift lever 50 to the top gear position shown in FIG. 4 as shift position A of the shift pattern 80. By doing so, the driver has closed switch SW6 and the control system 15 automatically controls shifting of the MAT 52 "top two" gears as long as operating conditions dictate normal auto-shift operation of these two gears. During vehicle operation with the shift lever 50 in a position other than the top gear position, or the A shift position of FIG. 4, control system 15 is continuously monitoring vehicle operating conditions. If operating conditions are detected which indicate the vehicle transmission should be in one of the "top two" gears, which conditions are mutually exclusive with operating conditions in any lower gear, signals are supplied to outputs OUT3 or OUT4 by ECM 20 to shift the transmission into the lowest of the top two gears that can be achieved under the operating conditions present at the time of the command. Some operating conditions that are monitored include: (1) whether the MAT 52 is in neutral as indicated by the feedback signals supplied to inputs IN9 and IN10 of ECM 20 or, with respect to MAT 70, that the gear ratio computations derived from the RPM sensor 22 and speed sensor 30 inputs correspond to an unknown gear ratio operating state for MAT 70 or a neutral state of operation, and (2) the present vehicle speed.

Figure 8:
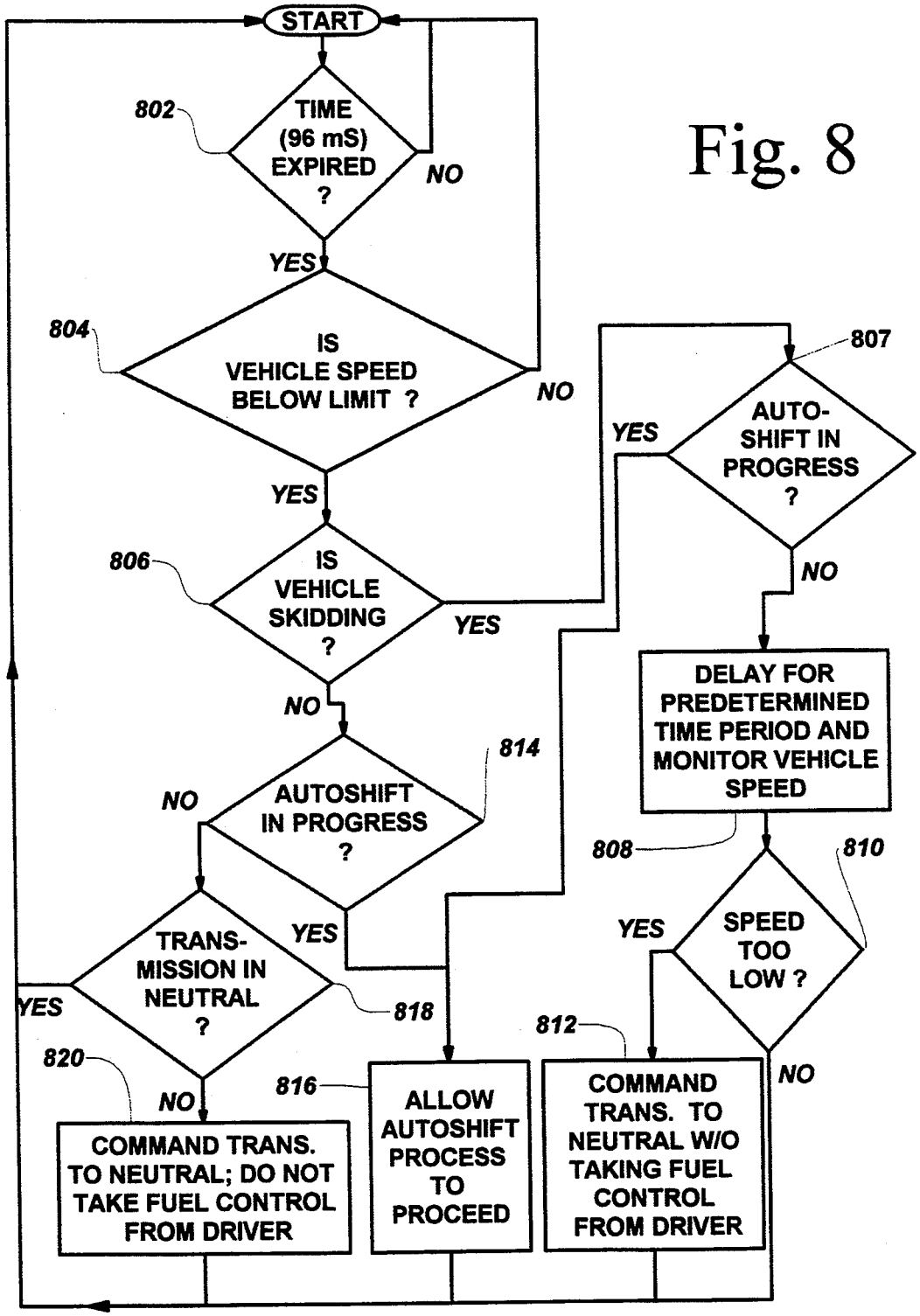
FIG. 8 is a more detailed flowchart of a portion of the auto-shift sequence according to the present invention.

Two separate control algorithms are continuously executed by ECM 20 that monitor operating conditions and control MAT 52 or MAT 70 to prevent undesirable operating conditions. Referring now to FIG. 8, the first algorithm is depicted. At step 802, a timer loop is implemented so that the remainder of the algorithm in FIG. 8 is executed by ECM 20 every 96 milliseconds. After the expiration of 96 milliseconds, program execution continues at step 804 and ECM 20 tests whether the vehicle speed is below a predetermined low speed limit. Below a specified speed such as 5 MPH, the MAT should not be in one of the top two gears. If the vehicle speed is above the low speed limit, program control returns to step 802. If the vehicle speed is detected as below the predetermined low speed limit in step 804, then it is next necessary to test whether the vehicle is "skidding", i.e., the driver has applied the brakes excessively and the vehicle wheels are not rotating before any automatic gear shift events may occur. A suggested low speed limit for use in step 804 is five (5) miles per hour. A "vehicle skidding" test is performed at step 806 to determine how ECM 20 will respond to the current operating conditions sensed. If the vehicle is skidding, a predetermined time delay must pass before ECM 20 tests whether an autoshift of the top two gears is in progress at step 807. If an autoshift is in progress then program execution continues at step 816 after step 807. If an autoshift is not in progress at step 807, then step 808 is next executed. At step 808 the vehicle speed is sensed by ECM 20. If the speed of the vehicle is below 5 MPH step 810, then the MAT is commanded to a neutral state via appropriate setting of the OUT3 and OUT4 outputs in step 812. If the sensed vehicle speed at step 810 is above a low speed (such as 5 MPH), then the MAT is not shifted to neutral and program execution returns to step 802. Fuel control of the engine is unaffected in step 812. After step 812 program execution returns to step 802.

If it is determined at step 806 that the vehicle is not skidding, then step 814 follows step 806, and ECM 20 determines whether an autoshift is currently in progress. If an autoshift is occurring, then the autoshift sequence is allowed to continue at step 816. If an autoshift sequence is not in progress at step 814, then the state of MAT 52 is detected at step 818. If MAT 52 is already in a neutral state, then program execution continues at step 802 following step 818. If MAT 52 is not in a neutral state at step 818, then MAT 52 is commanded to neutral by ECM 20 via control of outputs OUT3 and OUT4 at step 820. Program execution continues at step 802 after steps 816 and 820.

Figure 9:
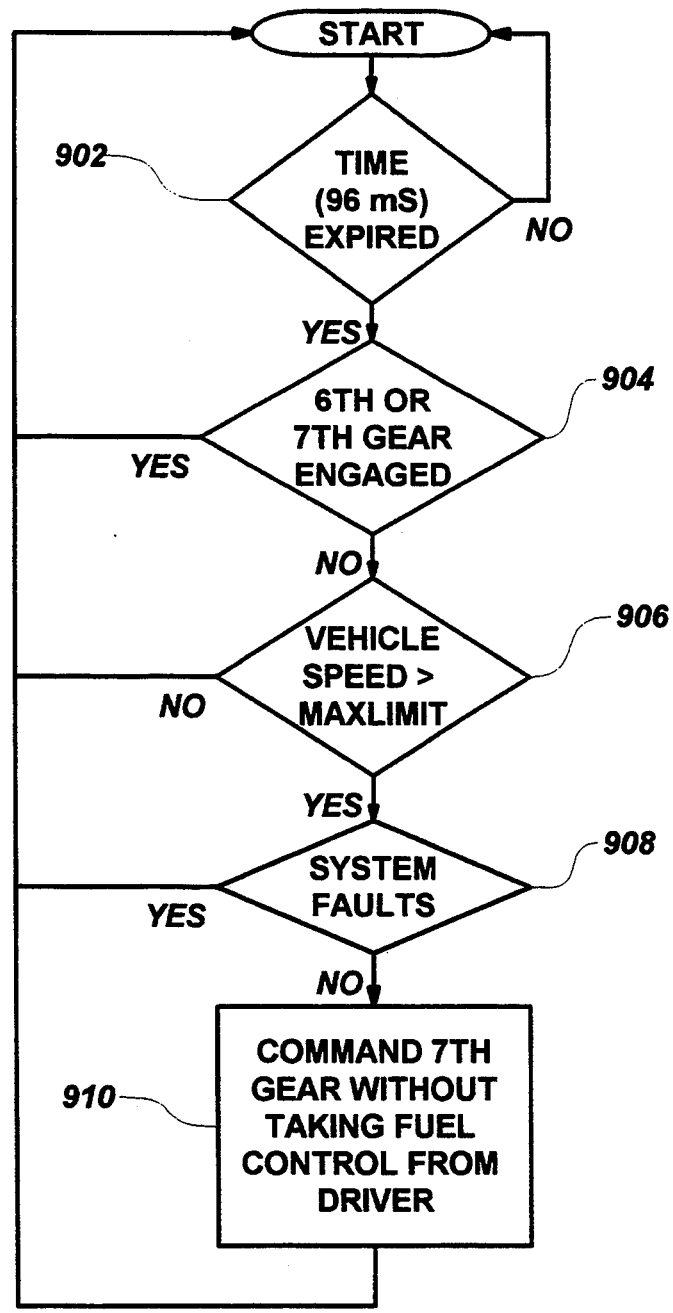
FIG. 9 is a more detailed flowchart of a portion of the auto-shift sequence according to the present invention.

A second algorithm shown in FIG. 9 addresses an excessive vehicle speed condition to control MAT 52 and prevent an undesirable state of operation. Referring to FIG. 9, the algorithm is executed every 96 milliseconds by way of the time expired test of step 902. If 96 milliseconds has expired, as tested at step 902, then the state of MAT 52 is detected through input signal IN10 by ECM 20. If sixth or seventh gear is engaged at step 904 then no action is required and program execution continues at step 902. If neither 6th or 7th gear is engaged at step 904, then the vehicle speed is sensed by ECM 20 at step 906. If the vehicle speed is greater than a maximum limit vehicle speed then program execution continues at step 908. At step 908, ECM 20 checks for various system faults, and if none is detected, then MAT 52 is commanded into 7th gear without taking fuel control from the driver at step 910. Program execution continues at step 902 following step 910. If vehicle speed is below the maximum limit at step 906, then program execution continues with step 902. The control algorithm of FIG. 9 ensures that MAT 52 is in 7th gear if the vehicle speed is excessive, e.g., greater than 65–70 MPH, thus preventing out-of-gear coasting at high speeds.

During the normal downshift process for the auto-shift mode of operation of the system 15, switch SW5 provides an input to ECM 20 indicating whether engine compression brake operation is desired during braking or deceleration of the vehicle. Switch SW5 is located in the cab area of the heavy duty truck and is a mechanical switch operable by the driver of the vehicle. Normally, the engine brakes 24 are active or enabled when the Switch SW5 is positioned accordingly, throttle is not applied or closed, and the clutch is engaged (pedal 36 out). If the driver has selected engine brake operation, and shifts the transmission in neutral and releases the throttle and clutch pedal, the engine brake will disengage below a predetermined engine RPM. This is an undesirable condition or result. In addition, during an electronically controlled shift, the clutch pedal 36 must be out and the engine speed electronically controlled for the auto-shifting process. This condition or set of conditions contradicts normal engine brake logic. More specifically, if the auto-shift gear requested fails to engage, with the engine compression brakes engaged, the engine brake must disengage below a predetermined RPM to prevent the engine from stalling. For an electronically controlled auto-shift to be performed correctly, complete engine control must be maintained by the control system 15. If the engine compression brakes are engaged and conditions are sensed which allow or enable the control system to perform an electronically controlled downshift, the ECM 20 must have enabling-/disabling control of the engine compression brakes so that the engine can be allowed to accelerate to achieve synchronous RPM to allow gear engagement. The control system 15 is able to achieve synchronous RPM for the engine via a control signal supplied to fuel supply controller 26 at output OUT2. Another possible operating condition that can damage the engine occurs if the engine is fueled during compression brake operation. This can result in severe engine damage, and may occur in the case when an electronically controlled auto-shift mode downshift occurs and fuel supply controller 26 is unable to raise the engine RPM to synchronous RPM speeds required for the gear shifting operation.

Thus, in order for the control system 15 to provide for safe operation of an engine compression brake 24, the above undesirable conditions for operation of the engine compression brake 24 must be detected and engine compression brake operation disabled during the time periods wherein engine brake operation is undesirable.

ECM 20 monitors the condition of the auto-shift sequence, current gear ratio (determined by the ratio of the input signals received from the RPM sensor and the vehicle speed sensor) the signal from the engine brake switch SW5, the signal from the clutch switch SW4, and the position of the throttle as indicated by the voltage present on wiper W1 supplied to A/D1 input of ECM 20 to determine whether an engine brake enable signal is supplied to output OUT1 thereby enabling operation of engine compression brake 24. By using the above inputs to ECM 20 as components of a logic equation, an algorithm is implemented to enable/disable engine compression brake operation. The logic algorithm is as follows: if wiper W1 voltage is less than a predetermined throttle closed voltage and switch SW4 is closed and switch SW5 is closed and the final drive gear ratio is verified as a valid gear ratio (as determined using the input signals from speed sensor 30 and RPM sensor 22) and ECM 20 is not currently undertaking to execute an auto-shift operation then activate the compression brake 24 via a signal supplied at output OUT1. If all of the separate conditions in the equation are true then the compression brakes are activated. Without this algorithm for controlling compression brake operation, there is no guarantee that the vehicle is "in gear", the basic requirement for desirable and correct operation of the compression brake. The means to ensure that proper conditions exist before activating the compression brake is reliant upon the above detected logic conditions. In order to accomplish electronically controlled automated gear ratio shifts with a manual/automatic transmission and a compression brake installed on the engine, the above conditions must be verified prior to enabling or activating the engine compression brake 24.

In addition to the previously described operational features of the control system 15, another feature of the control system 15 according to the present invention includes a means for providing variable electronically controlled gear shift speed points for cruise and non-cruise auto-shift operating modes. More specifically, software implemented algorithms establish variable speed points at which auto-shift mode gear shifts occur.

In a state or mode of operation wherein none of the cruise control modes are activated, the decisional algorithms for determining when an auto-shift upshift or downshift should occur are made in accordance with detected vehicle speed, engine RPM speed and throttle position. More specifically, if cruise control is not active, then an auto-upshift will occur if the engine speed is greater than the rated engine speed times a first scaling factor with the throttle open or the engine speed is greater than a second scaling factor times rated engine speed with the throttle closed. This algorithm transforms into the following equation:

If [(RPM>NORMAL_UP*HS_IDLE_RPM) .AND. (throttle=open)] .OR.
[(RPM>COAST_UP*HS_IDLE_RPM) .AND. (throttle=closed]
then upshift.

wherein NORMAL_UP is a scaling factor, HS_IDLE_RPM is rated engine speed, COAST_UP is a scaling factor, and RPM is actual engine speed. Values for NORMAL_UP and COAST_UP are typically 1.0 or less and are established in accordance with the engine torque curve, the transmission gear ratios for the top two gears and the final drive ratio of the vehicle drivetrain. A typical value for NORMAL_UP is approximately 1.0 and a typical value for COAST_UP is approximately 1.0. Increased flexibility is provided by setting COAST_UP to a value different from NORMAL_UP thereby forcing an upshift with throttle closed at a desired engine rpm. Setting COAST_UP to a large value effectively disables COAST_UP from affecting shift speeds so that an upshift occurs only if the throttle is open and RPM is greater than NORMAL_UP times HS_IDLE_RPM.

Accordingly, a non-cruise control downshift sequence is initiated by ECM 20 in response to the detection of the following conditions: the engine speed is less than or equal to a scaling factor (NORMAL_DWN) times rated engine speed with the throttle open or the engine speed is less than or equal to a scaling factor (COAST_DWN) times rated engine speed with the throttle closed. This logical algorithm transforms into the following equation:

IF [(RPM <= NORMAL_DWN*HS_IDLE_RPM) .AND. (throttle=open)]
.OR.
[(RPM <= COAST_DWN*HS_IDLE_RPM .AND. (throttle=closed)]
then downshift.

wherein NORMAL_DWN*HS_IDLE_RPM is an engine speed below rated engine speed, and COAST_DWN*HS_IDLE_RPM is an engine speed below rated engine speed and below NORMAL_DWN*HS_IDLE_RPM. NORMAL_DWN and COAST_DWN are scaling factors that enable tailoring the downshift speeds to a specific driveline combination in view of rated engine speed, transmission gear ratios and final drive gear ratios of the vehicle. COAST_DOWN can be set above or below NORMAL_DOWN but is normally below or equal. Setting COAST_DWN to a very small scaling factor prevents a downshift attributable to an engine speed less than (COAST_DWN*HS_IDLE_RPM).

Typical values for the above are HS_IDLE_RPM=1800, (NORMAL_DWN*HS_IDLE_RPM)=1300, (COAST_DWN*HS_IDLE_RPM)=1100, (NORMAL_UP*HS_IDLE_RPM)=1650 and (COAST_UP*HS_IDLE_RPM)=1750.

Closed throttle is detected when the throttle or accelerator pedal 40 positions wiper W1 of FIG. I so that the voltage supplied to input A/D1 is below a predetermined voltage. Open throttle is detected when the ECM 20 detects a voltage on wiper W1 greater than the voltage corresponding to a closed throttle condition.

In the case of variable speed shift points during cruise control operation of the control system 15, a review of basic cruise control system functional operation is essential to a proper system understanding. The cruise control system-incorporated into the control system 15 responds to actuation of switches SW2 and SW1. Fuel supply controller 26, clutch 27 and manual/automatic transmission 28 are controlled by ECM 20 in response to detection of certain operating condition parameters at the inputs of ECM 20. Cruise control switch SW2 enables cruise control mode of operation when closed. When cruise control is enabled, several modes of operation are available including a "set" mode, a "coast" mode, a "resume" mode, and an "acceleration" mode. These modes are typical operating modes found in contemporary cruise control systems for motor vehicles and are well known in the art of cruise control systems. In the "set" mode of operation, switch SW1 is activated so that a high logic level signal is supplied to input IN3 of ECM 20. By requesting "set" mode, the driver has indicated that the particular speed which is sensed via speed sensor 30 at input IN8 of ECM 20, is the desired or cruise speed at which the driver wishes the vehicle to continue to operate at or "cruise". Switch SW1 has a spring-return-to-center operation between the center off position and the set/coast position. Thus, the operator or driver must physically move the switch to the set/coast position in order to achieve the set or coast mode of operation. Upon the first closure of switch SW1 against the set/coast contact, ECM 20 maintains the speed signal sensed at input IN8 by controlling fuel supply controller 26 and the manual/automatic transmission 28. Upon the operator depressing the brake pedal 32, switch SW3 is closed momentarily, and a high level logic signal supplied to input IN1 of ECM 20 will deactivate the cruise control "set" mode of operation, and the ECM 20 releases its control of fuel to the engine via fuel supply controller 26 and returns throttle control to the driver. However, the control of auto-shifting operations by ECM 20 does not cease with the activation of brake switch SW3 until the driver of the vehicle actively disables the auto-shift operation state by moving the shift lever out of the auto-shift mode position, or vehicle speed drops below a predetermined limit such as 20 miles per hour.

If a desired set speed has been input using switch SW1 and the ECM 20 is attempting to maintain a constant vehicle speed or "cruise", and the driver subsequently closes switch SW1 again into the "set/coast" position, the system 15 returns throttle control to the driver and the desired "set" speed is replaced by the vehicle speed detected when the driver subsequently releases switch SW1 from the position wherein a high logic level signal is supplied to input IN3 of ECM 20. Thus, in the "coast" mode, the driver may increase or decrease the cruise speed by activating the coast mode (closing SW1 to set/coast position) to establish a new cruise speed for the vehicle.

When switch SW1 is toggled from the center off position to the resume/accel position, thereby supplying a high level logic signal to input IN4 of ECM 20, one of two other possible modes is activated. If a desired cruise speed has been previously established and the ECM 20 has received signals indicating that the ignition switch (not shown) has not been turned off, then the ECM 20 will maintain the previously set cruise speed in memory regardless of the condition of the brake pedal 32 and the brake switch SW3. However, ECM 20 releases control of the fuel supply controller 26 and allows the driver of the vehicle to control the fueling rate of the engine in this operating mode with cruise on, i.e. switch SW2 closed, and the brake pedal depression having deactivated the cruise mode. When the driver activates switch SW1 so that a logic high is supplied to input IN4, or to the "resume/accel" position, ECM 20 will again take over control of supplying fuel to the engine and via a signal supplied to output OUT2 attempt to change the speed of the engine to resume the desired or requested vehicle "set" speed. If during "set"

mode cruise control operating conditions the driver wishes to increase the cruise control "set" speed or accelerate, the driver need only move switch SW1 to the "resume/accel" position, thereby supplying a high logic level signal to input IN4 of ECM 20, to indicate to ECM 20 that an increasingly higher cruise "set" speed is desired. By holding the switch in this position, the driver can increase the speed of the engine and vehicle and then release switch SW1 so that it spring returns to the center off positions. The vehicle speed sensed when switch SW1 is released to the center off position will be the new "set" speed for cruise control operation.

In addition to fueling the engine to maintain a constant vehicle speed during cruise control operation, the ECM 20 must also determine when to shift the "top two" gears of MAT 28 in order to achieve maximum fuel economy as well as desired operational shifting characteristics. The following logical equations are used to determine the variable shift points for upshift and downshift conditions of the top "two gears" of MAT 28 during cruise control operation of system 15:

If [(RPM<CRUISE_DWN_RPM*HS_IDLE_RPM) .AND. (CRUISE_SET_SPEED - VSS>CRUISE_DWN) .OR. (RPM<CRU_DWN_RPM2*HS_IDLE_RPM)]
then downshift, If [RPM>CRUISE_UP_RPM*HS_IDLE_RPM) .AND. (CRUISE_SET_SPEED-VSS<CRUISE_UP) .OR. (RPM>CRU_UP_RPM2*HS_IDLE_RPM)]
then upshift.

The downshift equation in cruise control mode with accel mode, coast mode or throttle override mode active is:
If    RPM<NORMAL_DWN*HS_IDLE_RPM (rated engine speed) then downshift;
and the upshift equation in cruise control mode with accel mode, coast mode, or throttle override mode active is:
If RPM>NORMAL_UP*HS_IDLE_RPM (rated engine speed) then upshift.

Several values in the above equations are defined in terms of rated engine speed or HS_IDLE_RPM multiplied times a scaling factor. NORMAL_DWN is a scaling factor multiplied times HS_IDLE_RPM to obtain the engine speed at which an automatic downshift from the top gear takes place. NORMAL_UP is a scaling factor multiplied times HS_IDLE_RPM to ascertain the engine speed at which an automatic upshift into the top gear takes place. The engine torque curve, transmission gear ratios for the top two gears and final drive ratio of the vehicle driveline are factors directly affecting the selection of values for NORMAL_UP and NORMAL_DWN. Selecting appropriate values for NORMAL_DWN and NORMAL_UP in conjunction with the final drive ratio of a transmission and the differential drive ratio of the vehicle provides an effective technique to utilize an engine control system with a variety of engine/transmission/drivetrain combinations by varying but a few parameters supplied to the ECM 20. Typically, NORMAL_UP and NORMAL_DWN are values less than 1.0. For example, if the peak torque of an engine is 1300 and HS_IDLE_RPM is 1800 then NORMAL_UP is set to 1.0 so that an upshift to the top gear will occur at HS_IDLE_RPM or 1800 RPM, and vehicle acceleration in the top gear of the transmission occurs in the peak area of the engine's torque curve. Similarly, as the vehicle decelerates and RPM falls, a downshift in the top two gears becomes necessary when engine RPM falls below a predetermined limit. The lower RPM limit at which a downshift occurs is controlled by NORMAL_DWN as a function of HS_IDLE_RPM. For example, if HS_IDLE_RPM is 1800 and NORMAL_DWN is 0.72, then at (0.72*1800) RPM (or 1296 RPM) a downshift is determined necessary, and ECM 20 carries out the downshift via the previously described auto-shift sequence.

Other variables in the above shift equations are defined as follows:
(a) CRUISE_SET_SPEED is the set speed for cruise control;
(b) CRUISE_DWN_RPM is a scaling factor used to calculate an RPM value below and within a predetermined range of rated engine speed of the engine, a typical value for CRUISE_DWN_RPM is 0.68;
(c) VSS is current vehicle speed;
(d) CRU_DWN_RPM2 is a scaling factor used to calculate a predetermined engine speed value less than CRUISE_DWN_RPM, a typical value for CRU_DWN_$RPM2$ is 0.62;
(e) CRUISE_UP_RPM is a scaling factor used to calculate a predetermined engine speed value within a predetermined range of the rated engine speed, a typical value for CRUISE_UP_RPM is 0.89;
(f) CRU_UP_RPM2 is a scaling factor used to calculate a predetermined engine speed value greater than CRUISE_UP_RPM, a typical value for CRU_UP_RPM2 is 1.0;
(g) CRUISE_DWN is a predetermined vehicle speed value subtracted from CRUISE_SET_SPEED to determine the speed at which a downshift is requested, a typical value for CRUISE_DWN is 4 mph;
(h) CRUISE_UP is a predetermined vehicle speed value added to CRUISE_SET_SPEED to define the vehicle speed at which an upshift is requested, a typical value for CRUISE_UP is 2 mph.

Throttle override occurs when the driver depresses the accelerator pedal while cruise control mode is active to increase vehicle speed above the CRUISE_SET_SPEED or to increase acceleration of the vehicle above the acceleration rate set by ECM 20 to attain CRUISE_SET_SPEED.

Auto-shift algorithms for determining when an upshift or downshift should occur between the "top two" gears of MAT 28 provide enhanced operation of the manual/automatic transmission system and a more sophisticated cruise control system for heavy duty truck vehicles. The heavy duty truck in which the system 15 is installed includes a Cummins N14 or L10 engine equipped with a CELECT electronic engine control manufactured by Cummins Electronics Incorporated, a subsidiary of Cummins Engine Company, Inc., of Columbus, Ind. The software included in the CELECT (shown in FIGS. 6 and 6A) engine control module or electronic control module is modified and additional hardware is added to control the Eaton or Spicer transmissions. The Eaton transmission is a model RTT-12609A splitter-type transmission and the Dana Spicer transmission is a model AS125-7 raft-type transmission. With either Cummins-Eaton or the Cummins-Spicer drive-line configuration, the additional software resident in the CELECT ECM will monitor the vehicle's performance and automatically control the "top two"

gears of the transmission in either cruise or non-cruise operating modes. The variable speed shift point algorithms are designed to optimize gear shift points and maximum fuel economy without any loss in driveability of the vehicle.

The software executed by the CELECT system is included in this application and can be found following the Description of the Preferred Embodiment. The software is written in assembly language and was developed using an Apollo development system and is executable by a Model 80196 Intel microcomputer.

Figure 6A:
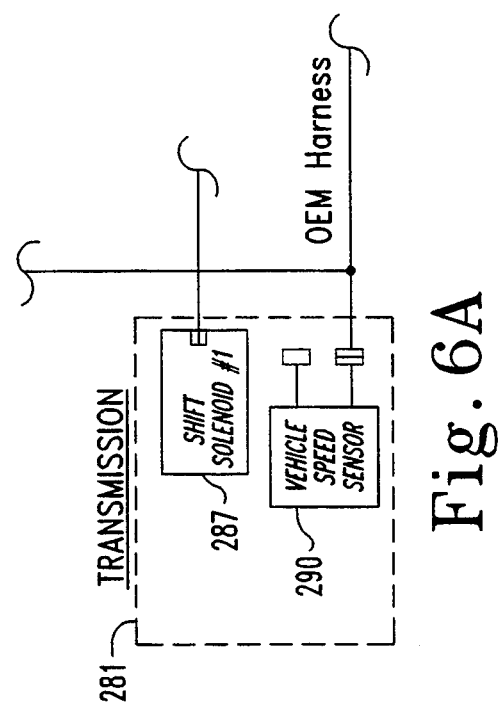
FIG. 6A is an alternate embodiment of the transmission interface shown in FIG. 6 and corresponds to the transmission interface depicted in FIG. 3.
Figure 6:
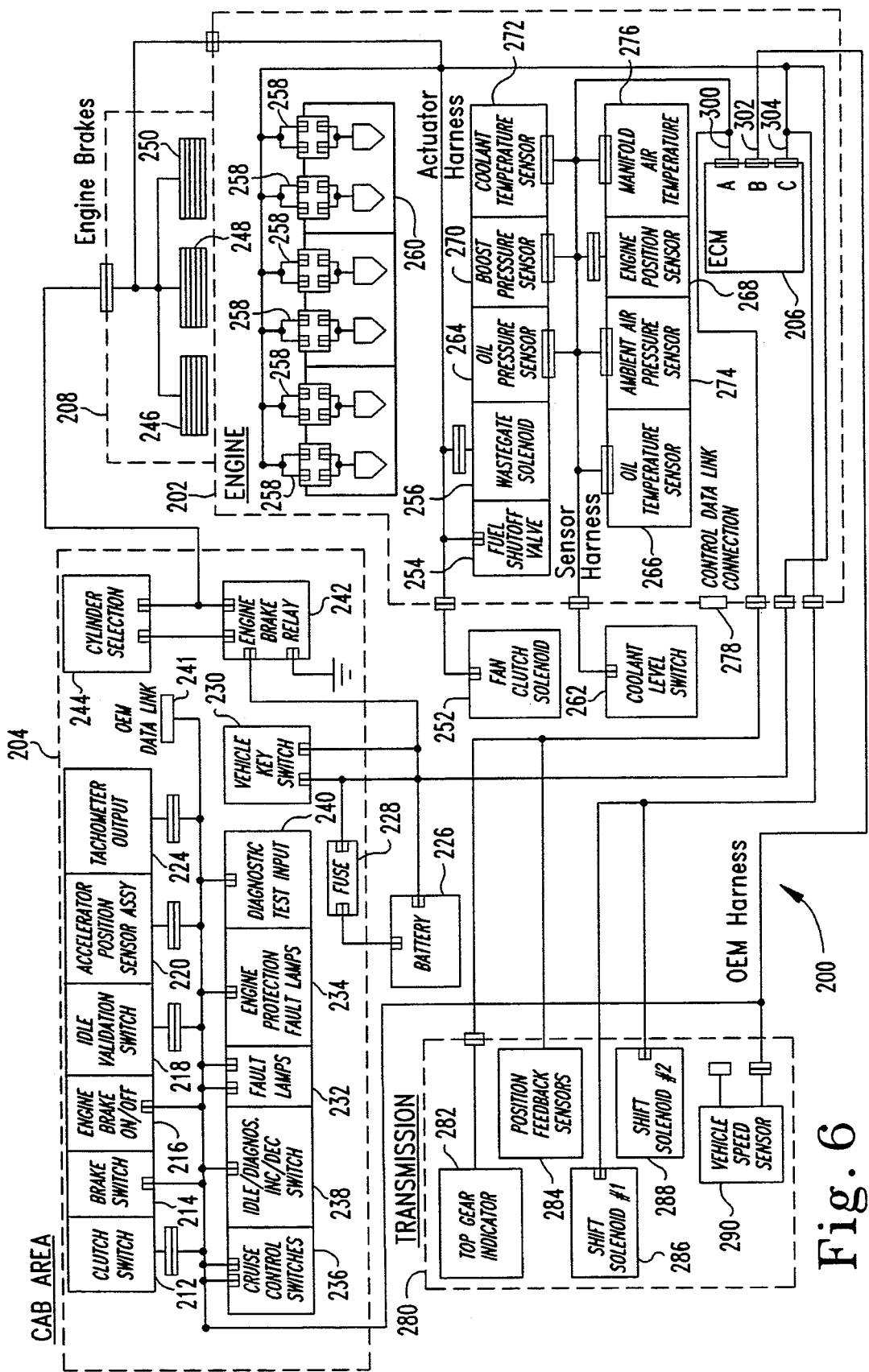
FIG. 6 is a diagrammatic illustration of a control system which includes the controller of FIGS. 1 and 2.

Referring now to FIG. 6, a diagrammatic illustration of an electronic control system 200 according to the present invention is shown which includes all of the components of system 15 of FIG. I and additional system capability. The principal components of this system are ECM 206, engine 202, cab mounted hardware within cab area 204 and transmission 280. ECM 206 corresponds with ECM 20 of FIG. 1. Three wiring harnesses are connected to ECM 206 at locations A, B and C. At location A, a sensor harness 300 is connected to ECM 206. Sensor harness 300 provides signal paths for connecting sensors to ECM 206. OEM harness 302 provides connections between cab area mounted hardware, the vehicle speed sensor 290 of transmission 280 and ECM 206. Actuator harness 304 connected to location C of ECM 206 provides signal paths for actuation of the various devices hereinafter described which control the operation of the transmission and engine. In addition, a signal from ignition key switch 230 is supplied to an input of ECM 206 via harness 304.

The switches, lamps, and other devices mounted in the truck cab area 204 provide the driver with means for controlling the system functions as well as feedback in the form of lamps, LED's and displays which indicate system status. Clutch switch 212, brake switch 214 and cruise control switches 236 correspond to the clutch switch SW4, brake switch SW3 and cruise control switches SW1 and SW2 of FIG. 1, respectively. Engine brake on/off switch 216 corresponds to switch SW5 of FIG. 1. Accelerator position sensor assembly 220 corresponds to potentiometer P1 of FIG. 1. Tachometer 224 provides the driver with visual feedback regarding engine speed or RPM. Battery 226 supplies electrical power to the system through fuse 228. Vehicle key switch 230 is connected to engine brake relay unit 242 and to ECM 206. Fault lamps 232 provide the driver with fault indications regarding system operation. Engine protection fault lamps 234 provide driver feedback regarding faults associated with operation of engine 202. Switch 238 is a center-off single-pole double-throw switch which, when activated, provides increment and decrement input signals to ECM 206 associated with an idle/diagnostics mode. Switch 240 provides an input to ECM 206 indicating that the operator wishes to enter the diagnostic test mode. Data link 241 is provided so that additional electronic hardware can be connected to the OEM harness 302 to communicate with ECM 206 and retrieve data stored in ECM 206 regarding operating history and faults experienced by ECM 206 over a period of time during which the software within ECM 206 has executed and monitored the operational parameters of the system 200.

Engine brake relay unit 242 receives a power signal from vehicle key switch 230 and provides signals to cylinder selection device 244 for control of the engine brake unit 208. Pairs of engine cylinders are individually controlled by brake controller devices 246, 248 and 250, so that engine braking action can be actuated in a three-stage fashion to provide three different levels of engine braking action. Engine brake 208 is well known in the art of heavy-duty engines and is sold by Cummins Engine Company, Inc. of Columbus, Ind.

Engine 202 includes cylinder block 260 wherein fuel injectors 258 are mounted. Fuel injectors 258 are controlled by signals from ECM 206. Fuel shut-off valve 254 and waste gate solenoid 256 are directly controlled by ECM 206. Fan clutch solenoid 252 is activated by ECM 206 according to operating conditions dictated by the software of 206. Coolant level sensor 262, oil pressure sensor 264, oil temperature sensor 266, engine position sensor 268, boost pressure sensor 270, coolant temperature sensor 272, ambient air pressure sensor 274 and intake manifold temperature sensor 276 provide input signals which enable monitoring of operating conditions and provide feedback signals regarding the operating conditions of engine 202.

The embodiment of the devices shown in FIGS. 1 and 2 is more fully and completely shown by the diagrammatic illustration of FIG. 6. Thus, the transmission 280 of FIG. 6 corresponds directly to the MAT 52 of FIG. 2. An input signal from top gear indicator 282 corresponds to the switch SW6 of FIG. 2. Position feedback sensors 284 correspond to the neutral feedback signal and in-gear feedback signals supplied to inputs IN9 and IN10 of FIG. 2, respectively. Shift solenoid 286 and shift solenoid 288 are operated in response to signals supplied to output OUT3 and OUT4 respectively of FIG. 2. Vehicle speed sensor 290 corresponds to the speed sensor 30 of FIG. 1.

An embodiment comprising the system of FIG. 1 and FIG. 3 is illustrated essentially in FIG. 6 with the exception of transmission 280 being replaced by the transmission 281 of FIG. 6A. More specifically, the shift solenoid 287 of FIG. 6A corresponds to the device coupled to output OUT3 of ECM 20 in FIG. 3 and the vehicle speed sensor 290 of transmission 281 corresponds to the speed sensor 30 of FIG. 1. All remaining components are identical for the two systems. FIG. 6A depicts the location of the shift solenoid and vehicle speed sensor of the embodiment shown in FIG. 3 thereby enabling one skilled in the art to understand more fully the componentry location of the control system according to the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cruise control system for automatically controlling speed and transmission shifting of an engine powered vehicle in response to receiving a desired speed input from the driver, said cruise control system comprising:
   an engine;
   a manual/automatic transmission including a plurality of manually engagable gear ratio operation states and a first and a second automatically engagable gear ratio operation states, said first and second gear ratio operation states actuated in response to downshift and upshift signals, respectively, supplied to an input of said transmission;

means for sensing vehicle speed and producing a speed signal corresponding thereto;

means for sensing engine speed and producing an RPM signal corresponding thereto;

means for inputting a desired vehicle speed value from the driver;

means for fueling said engine, said means for fueling responding to said speed signal and adjusting the fueling supply rate for the engine to maintain said speed signal within a predetermined deviation from said desired speed value;

means for producing said downshift signal according to the following downshift equation:

If [(RPM<cruise_dwn_rpm * HS_IDLE_RPM .AND. (cruise_set_speed - VSS>cruise_DWN) .OR. (RPM<cru_dwn_rpm2 * HS_IDLE_RPM)]
then produce said downshift signal; and means for producing said upshift signal according to the following upshift equation:

If [RPM>cruise_up_rpm * HS_IDLE_RPM) .AND. (cruise_set_speed-VSS<cruise_up) .OR. (RPM>cru_up_rpm2 * HS_IDLE_RPM)]
then produce said upshift signal;

wherein the variables of the upshift and downshift equations are defined as follows:
RPM = engine speed;
VSS = vehicle speed;
HS_IDLE_RPM is a rated engine speed value defining a maximum operational engine speed based upon engine design;
cruise_set_speed is a cruise control set speed established by the driver during cruise control operation;
cruise_dwn_rpm is a scaling factor multiplied times HS_IDLE_RPM to produce a first engine speed value below rated engine speed of the engine;
CRU_DWN_RPM2 is a scaling factor multiplied times HS_IDLE_RPM to produce a second engine speed value that is greater than CRUISE_DWN_RPM * HS_IDLE_RPM;
CRUISE_UP_RPM is a scaling factor multiplied times HS_IDLE_RPM to produce a third engine speed value;
CRU_UP_RPM2 is a scaling factor multiplied times HS_IDLE_RPM to produce a fourth engine speed value that is greater than CRUISE_UP_RPM * HS_IDLE_RPM;
CRUISE_DWN is a first vehicle speed offset value; and
CRUISE_UP is a second vehicle speed offset value.

2. The system of claim 1 including mode switch means for producing an alternate mode signal in response to a driver input; and
wherein said means for producing said downshift signal responds to said alternate mode signal by utilizing the following alternate mode downshift equation in producing said downshift signal while said alternate mode signal is present:

If RPM<NORMAL_DWN*HS_IDLE_RPM then produce said downshift signal,
wherein NORMAL_DWN is a scaling factor multiplied times HS_IDLE_RPM to obtain a downshift engine speed at which a downshift from said second gear ratio operation state to said first gear ratio operation state is desired.

3. The system of claim 2 wherein said means for producing said upshift signal responds to said alternate mode signal by utilizing the following alternate mode upshift equation in producing said upshift signal while said alternate mode signal is present:

If RPM>NORMAL_UP*HS_IDLE_RPM then produce said upshift signal,
wherein NORMAL_UP is a scaling factor multiplied times HS_IDLE_RPM to obtain an upshift engine speed at which an upshift from said first gear ratio operation state to said second gear ratio operation state is desired.

4. The system of claim 3 wherein said first engine speed value is equal to or less than HS_IDLE_RPM.

5. The system of claim 4 wherein said third engine speed value is equal to or greater than HS_IDLE_RPM.

6. The system of claim 5 wherein said second engine speed value is less than a peak torque speed of the engine.

7. The system of claim 6 wherein said fourth engine speed value is greater than HS_IDLE_RPM.

8. The system of claim 1 wherein said means for fueling said engine includes circuit means responsive to said speed signal for providing a fueling signal corresponding to desired fueling rate, and fuel supply means for metering the supply of fuel to said engine in proportion to said fueling signal.

9. The system of claim 8 wherein said means for inputting a desired vehicle speed value, said means for producing said upshift signal, said circuit means and said means for producing said downshift signal are components of an engine control computer means including a microcomputer having inputs for inputting said speed signal, said rpm signal, said desired speed value, said alternate mode signal, and outputs for producing said upshift signal, said downshift signal and said fueling signal.

10. The system of claim 9 wherein said alternate mode signal corresponds to an acceleration mode, a coast mode or a throttle override mode of operation of said cruise control system.

11. A method for automatically controlling speed and transmission shifting of an engine powered vehicle in response to receiving a desired speed input from the driver, said method comprising the steps of:
providing an engine;
providing a manual/automatic transmission having a plurality of manually engagable gear ratio operation states and a first and a second automatically engagable gear ratio operation states, said first and second gear ratio operation states actuated in response to downshift and upshift signals, respectively, supplied to an input of said transmission;
sensing vehicle speed and producing a speed signal corresponding thereto;
sensing engine speed and producing an RPM signal corresponding thereto;
inputting a desired vehicle speed value from the driver;
fueling said engine, said fueling step including responding to said speed signal and adjusting the fueling supply rate for the engine in an attempt to maintain said speed signal within a predetermined deviation from said desired speed value;

producing said downshift signal according to the following downshift equation:

If [(RPM<cruise_dwn_rpm * HS_IDLE_RPM) .AND. (cruise_set_speed - VSS>cruise_DWN) .OR. (RPM<cru_dwn_rpm2 * HS_IDLE_RPM)]

and producing said upshift signal according to the following upshift equation:

If [(RPM>cruise_up_rpm * HS_IDLE_RPM) .AND. (cruise_set_speed-VSS<cruise_UP) .OR. (RPM>cru_up_rpm2 * HS_IDLE_RPM)]

wherein the variables of the upshift and downshift equations are defined as follows:

RPM = engine speed;
VSS = vehicle speed;
HS_IDLE_RPM is a rated engine speed value defining a maximum operational engine speed based upon engine design;
cruise_set_speed is a cruise control set speed established by the driver during cruise control operation;
cruise_dwn_rpm is a scaling factor multiplied times HS_IDLE_RPM to produce a first engine speed value below rated engine speed of the engine;
CRU_DWN_RPM2 is a scaling factor multiplied time HS_IDLE_RPM to produce a second engine speed value that is less than CRUISE_DWN_RPM * HS_IDLE_RPM;
CRUISE_UP_RPM is a scaling factor multiplied times HS_IDLE_RPM to produce a third engine speed value;
CRU_UP_RPM2 is a scaling factor multiplied time HS_IDLE_RPM to produce a fourth engine speed value that is greater than CRUISE_UP_RPM * HS_IDLE_RPM;
CRUISE_DWN is a first vehicle speed offset value; and
CRUISE_UP is a second vehicle speed offset value.

12. The method of claim 11 including the steps of:
producing an alternate mode signal in response to a driver input; and
producing said downshift signal in response to said alternate mode signal by utilizing the following alternate mode downshift equation while said alternate mode signal is present:

If RPM<NORMAL_DWN*HS_IDLE_RPM then produce said downshift signal,
wherein NORMAL_DWN is a scaling factor multiplied times HS_IDLE_RPM to obtain a downshift engine speed at which a downshift from said second gear ratio operation state to said first gear ratio operation state is desired.

13. The method of claim 12 including the following step:
producing said upshift signal in response to said alternate mode signal by utilizing the following alternate mode upshift equation while said alternate mode signal is present:

If RPM>NORMAL_UP*HS_IDLE_RPM
then produce said upshift signal,
wherein NORMAL_UP is a scaling factor multiplied times HS_IDLE_RPM to obtain an upshift engine speed at which an upshift from said first gear ratio operation state to said second gear ratio operation state is desired.

14. The method of claim 13 wherein said first engine speed value is equal to or less than HS_IDLE_RPM.

15. The method of claim 14 wherein said third engine speed value is equal to or greater than HS_IDLE_RPM.

16. The method of claim 15 wherein said second engine speed value is less than a peak torque speed of the engine.

17. The method of claim 16 wherein said fourth engine speed value is greater than HS_IDL_RPM.

18. A cruise control system for maintaining a substantially constant vehicle speed for an engine powered vehicle in response to receiving a desired speed signal from the driver of the vehicle, said cruise control system comprising:

an engine;
a manual/automatic transmission having a manual mode of operation including a plurality of manually engagable gear ratio operation states, and an automatic mode of operation including first and second automatically engagable gear ratio operation states, said first and second automatically engagable gear ratio operation states actuated in response to downshift and upshift signals, respectively, supplied to an input of said transmission;
shift means for enabling driver selection between said manually engagable gear ratio states and said automatic mode of operation;
means for inputting from the driver said desired speed signal;
means for determining engine speed and producing an RPM signal corresponding thereto;
means for determining vehicle speed and producing a speed signal corresponding thereto;
means responsive to said desired speed input for fueling said engine to maintain said substantially constant vehicle speed; and
programmable means comprising a programmed data processor for producing said downshift and said upshift signal, said programmable means monitoring said desired speed signal, said RPM signal and said speed signal and producing said downshift signal when said RPM signal is below a first predetermined engine speed level and said speed signal is below a first predetermined vehicle speed level or when said RPM signal is below a second predetermined engine speed level wherein said first predetermined engine speed level is greater than said second predetermined engine speed level, and said first predetermined vehicle speed level is less than said desired speed signal, said programmable means producing said upshift signal when said RPM signal is greater than a third predetermined engine speed level and said vehicle speed signal is greater than a second predetermined vehicle speed level or when said RPM signal is above a fourth predetermined engine speed level, wherein said third predetermined engine speed level is less than said fourth predetermined engine speed level, and said second predetermined vehicle speed level is greater than said desired speed signal.

19. The system of claim 18 wherein said first and third predetermined engine speed levels substantially correspond to a rated engine speed of said engine.

20. The system of claim 19 wherein said second predetermined engine speed level corresponds to an engine speed below a peak torque engine speed rating of said engine and said fourth predetermined engine speed level corresponds to an engine speed above said peak torque engine speed rating.

21. The system of claim 18 wherein said first predetermined engine speed level corresponds to an engine speed within a first predetermined range of said rated engine speed of said engine.

22. The system of claim 21 wherein said third predetermined engine speed level corresponds to an engine speed within a second predetermined range of said rated engine speed.

23. The system of claim 18 wherein said transmission is a heavy duty truck transmission.

24. The system of claim 18 wherein said engine is a heavy duty fuel-injected Diesel engine.

25. A transmission shift control system comprising:
an engine having a throttle control;
means for monitoring the position of said throttle control and producing a throttle signal having a closed throttle state and an open throttle state;
a manual/automatic transmission having a manual mode of operation including a plurality of manually engagable gear ratio operation states, and an automatic mode of operation including first and second automatically engagable gear ratio operation states, said first and second automatically engagable gear ratio operation states actuated in response to downshift and upshift signals, respectively, supplied to an input of said transmission;
shift means for enabling driver selection between said manually engagable gear ratio states and said automatic mode of operation;
means for determining engine speed and producing an RPM signal corresponding thereto;
means for determining vehicle speed and producing a speed signal corresponding thereto; and
programmable means comprising a programmed data processor for producing said downshift and said upshift signal, said programmable means monitoring said throttle signal, said RPM signal and said speed signal and:
a) producing said upshift signal when said RPM signal is greater than a first predetermined engine speed level and said throttle signal is in said throttle open state;
b) producing said upshift signal when said RPM signal is greater than said first predetermined engine speed level minus a first predetermined offset level and said throttle signal is in said throttle closed state;
c) producing said downshift signal when said RPM signal is less than or equal to first predetermined engine speed level and said throttle signal is in said throttle open state;
d) producing said downshift signal when said RPM signal is less than said first predetermined engine speed level minus a second predetermined offset level and said throttle signal is in said throttle closed state.

26. The system of claim 25 wherein said first predetermined engine speed level is within a range of plus or minus 500 rpm of a rated engine speed for said engine.

27. A method for producing shift signals for a transmission comprising the steps of:
providing an engine having a throttle control;
monitoring the position of said throttle control and producing a throttle signal having a closed throttle state and an open throttle state;
providing a manual/automatic transmission having a manual mode of operation including a plurality of manually engagable gear ratio operation states, and an automatic mode of operation including first and second automatically engagable gear ratio operation states, said first and second automatically engagable gear ratio operation states actuated in response to downshift and upshift signals, respectively, supplied to an input of said transmission;
enabling driver selection between said manually engagable gear ratio states and said automatic mode of operation;
determining engine speed and producing an RPM signal corresponding thereto;
determining vehicle speed and producing a speed signal corresponding thereto;
producing said upshift signal when said RPM signal is greater than a first predetermined engine speed level and said throttle signal is in said throttle open state;
producing said upshift signal when said RPM signal is greater than said first predetermined engine speed level minus a first predetermined offset level and said throttle signal is in said throttle closed state;
producing said downshift signal when said RPM signal is less than or equal to first predetermined engine speed level and said throttle signal is in said throttle open state; and
producing said downshift signal when said RPM signal is less than said first predetermined engine speed level minus a second predetermined offset level and said throttle signal is in said throttle closed state.

28. The method of claim 27 wherein said first predetermined engine speed level is within a range of plus or minus 500 rpm of a rated engine speed for said engine.

29. A control system for automatically controlling transmission shifting of an engine powered vehicle comprising:
an engine;
a manual/automatic transmission including a plurality of manually engagable gear ratio operation states and a first and a second automatically engagable gear ratio operation states, said first and second gear ratio operation states actuated in response to downshift and upshift signals, respectively, supplied to an input of said transmission;
means for sensing vehicle speed and producing a speed signal corresponding thereto;
means for sensing engine speed and producing an RPM signal corresponding thereto;
throttle means responsive to driver commands for producing a throttle signal corresponding to the engine throttle level desired by the driver;
means for fueling said engine, said means for fueling responding to said throttle signal and adjusting the fueling supply rate for the engine in accordance therewith;
means for producing said downshift signal according to the following downshift equation:

If
[(RPM <= NORMAL_DWN*HS_IDLE_RPM) .AND. (THROTTLE <> CLOSED)]
.OR.
[(RPM <= COAST_DWN*HS_IDLE_RPM) .AND. (THROTTLE=closed)]

then produce said downshift signal; and
means for producing said upshift signal according to the following upshift equation:

If
[(RPM > NORMAL_UP * HS_IDLE_RPM) .AND. (THROTTLE <> CLOSED)]
.OR.
[(RPM>COAST_UP * HS_IDLE_RPM) .AND. (THROTTLE=CLOSED)]

then produce said upshift signal;
wherein the variables of the upshift and downshift equations are defined as follows:
RPM=engine speed;
HS_IDLE_RPM is a rated engine speed value defining a maximum operational engine speed based upon engine design;
NORMAL_DWN is a scaling factor multiplied times HS_IDLE_RPM to obtain a downshift engine speed at which a downshift from said second gear ratio operation state to said first gear ratio operation, state is desired if THROTTLE is not closed;
NORMAL_UP is a scaling factor multiplied times HS_IDLE_RPM to obtain an upshift engine speed at which an upshift from said first gear ratio operation state to said second gear ratio operation state is desired if THROTTLE is not CLOSED;
COAST_DWN is a scaling factor multiplied times HS_IDLE_RPM to produce a first engine speed value at which a downshift is desired when the throttle is closed;
COAST_UP is a scaling factor multiplied time HS_IDLE_RPM to produce a second engine speed at which an upshift is desired when the throttle is CLOSED;
THROTTLE corresponds to the throttle signal; and
CLOSED is a position of said throttle means corresponding to a throttle signal below a predetermined level thereby indicating that the driver is not requesting fuel flow to the engine above a predetermined idle speed throttle setting.

* * * * *

UNITED STATES PATENT AND TRADEMARK OFFICE
CERTIFICATE OF CORRECTION

PATENT NO. : 5,393,277
DATED : February 28, 1995
INVENTOR(S) : Gregory R. White, et al.

It is certified that error appears in the above-indentified patent and that said Letters Patent is hereby corrected as shown below:

In Col. 16, at line 22, replace "$_{RPM2\ is}$" with -- $__RPM2\ is$ --.

Signed and Sealed this

Sixth Day of June, 1995

BRUCE LEHMAN

Attest:

Attesting Officer

Commissioner of Patents and Trademarks